US011393122B1

(12) United States Patent
Friedman et al.

(10) Patent No.: US 11,393,122 B1
(45) Date of Patent: Jul. 19, 2022

(54) METHOD AND SYSTEM FOR DETERMINING CONTEXTUAL OBJECT POSITION

(71) Applicant: Walkout Ltd., Tel Aviv (IL)

(72) Inventors: Yuval Friedman, Netanya (IL); Ben Pshedetzky, Tel Aviv (IL); Tomer Fael, Tsur Hadassa (IL); Guy Rosenthal, Tel Aviv (IL)

(73) Assignee: Walkout Ltd., Caesarea (IL)

( * ) Notice: Subject to any disclaimer, the term of this patent is extended or adjusted under 35 U.S.C. 154(b) by 0 days.

(21) Appl. No.: 17/518,004

(22) Filed: Nov. 3, 2021

(51) Int. Cl.
*G06T 7/70* (2017.01)
*G06T 7/13* (2017.01)
*G06K 9/62* (2022.01)
*G06V 20/20* (2022.01)

(52) U.S. Cl.
CPC .............. *G06T 7/70* (2017.01); *G06K 9/6215* (2013.01); *G06T 7/13* (2017.01); *G06V 20/20* (2022.01); *G06T 2207/20084* (2013.01); *G06T 2207/20132* (2013.01)

(58) Field of Classification Search
None
See application file for complete search history.

(56) References Cited

U.S. PATENT DOCUMENTS

| | | | |
|---|---|---|---|
| 2017/0294027 A1* | 10/2017 | Babenko | G06K 9/6271 |
| 2018/0218351 A1* | 8/2018 | Chaubard | H04N 7/181 |
| 2019/0108396 A1* | 4/2019 | Dal Mutto | G06K 9/6267 |
| 2020/0104594 A1* | 4/2020 | Zucker | G06K 9/3233 |
| 2020/0198680 A1* | 6/2020 | Hagen | B62B 5/0096 |
| 2020/0394453 A1* | 12/2020 | Ma | G06N 20/00 |
| 2021/0177163 A1* | 6/2021 | Cohn | G07G 1/0081 |
| 2021/0284223 A1* | 9/2021 | Carter | G06K 9/6256 |

FOREIGN PATENT DOCUMENTS

WO WO-2020222236 A1 * 11/2020 ............ G07G 1/0063

* cited by examiner

*Primary Examiner* — Delomia L Gilliard
(74) *Attorney, Agent, or Firm* — Pearl Cohen Zedek Latzer Baratz LLP

(57) ABSTRACT

A method and system for determining a position of an object with respect to a semi-transparent container, by: receiving, from a camera attached to a semi-transparent container, an image of a scene in proximity to the semi-transparent container; detecting, by an object detector, a new object present in the image, else marking the image as being an image indicative of a current state of the semi-transparent container; cropping, by a computer processor, the image to produce a cropped object image; analyzing, by the computer processor, the cropped object image; and assigning, by the computer processor, a confidence score in a numeric range to the cropped object image, wherein a score at one end of the range indicates the new object corresponding to the cropped object image is inside the semi-transparent container, and wherein a score at the other end of the range indicates the new object is outside.

19 Claims, 10 Drawing Sheets

700

| | |
|---|---|
| CALIBRATING AT LEAST TWO CAMERAS TO PROVIDE A SINGLE COORDINATE SYSTEM | 702 |
| RECEIVING IMAGES FROM AT LEAST TWO CAMERAS | 712 |
| ASSOCIATING AT LEAST ONE OBJECT BETWEEN IMAGES | 722 |
| EXTRACTING ANCHOR POINTS | 724 |
| ESTIMATING A 3D LOCATION OF THE AT LEAST ONE OBJECT | 742 |
| CALCULATING A DISTANCE TO THE 3D LOCATION | 744 |
| SCORE ASSIGNMENT | 750 |

FIG. 7B

METHOD AND SYSTEM FOR DETERMINING CONTEXTUAL OBJECT POSITION

FIELD OF THE INVENTION

The present application is in the field of understanding contextual object placement, in particular understanding the position of an object with respect to a semi-transparent container (e.g. object located inside or outside the semi-transparent container).

BACKGROUND OF THE INVENTION

The nature of instore shopping is changing. Along with the conventional human checkout operator there are now self-service checkouts where customers can scan their own items. Further technological developments have led to some stores foregoing checkouts altogether, monitoring customers and the items they place in their basket and charging them without any interaction with a point of sale (POS). Despite these advancements there remain drawbacks to their implementation; many baskets and/or shopping carts are semi-transparent, allowing a view outside their interior volumes. Accordingly, when cameras mounted to such baskets and/or shopping carts are observing items placed within, they may also observe items outside the interior of the basket and/or shopping cart, for example on a nearby shelf, and may erroneously catalogue this item as being intended for purchase. This situation is especially problematic when cameras only observe a two-dimensional projection of a three-dimensional scene because, as shown in FIGS. 1A-1C, in the absence of depth and distance information two distinct three-dimensional situations (FIG. 1A or FIG. 1B) may present a similar, single, two-dimensional projection (FIG. 1C). In other words, it may be difficult to determine if an object 101 is outside (FIG. 1A) a shopping cart/basket 102 or inside (FIG. 1B) the shopping cart/basket 102, because in the absence of depth and distance information it may be difficult to determine if a bar 103 of the shopping cart/basket 102 is in front of or behind the object 101.

SUMMARY OF THE INVENTION

According to embodiments of the present invention there is thus provided a method for determining a position of an object with respect to a semi-transparent container, the method comprising: receiving, from at least one camera attached to the semi-transparent container, at least one image of a scene in proximity to the semi-transparent container; detecting, by an object detector, at least one new object present in the at least one image, else marking the image as being an image indicative of a current state of the semi-transparent container; cropping, by a computer processor, the at least one image to produce a cropped object image; analyzing, by the computer processor, the cropped object image; and assigning, by the computer processor, and based on the analyzing, a confidence score in a numeric range to the cropped object image, wherein a score at one end of the range indicates the at least one new object corresponding to the cropped object image is inside the semi-transparent container, and wherein a score at the other end of the range indicates the at least one new object is outside the semi-transparent container.

According to some embodiments the analyzing and assigning comprises inputting the cropped object image to a pre-trained classifier convolutional neural network (CNN), wherein the classifier CNN arrives at an inference by: receiving the cropped object image; processing, by consecutive convolutional layers, the cropped object image, thereby generating a vector; applying a softmax function to the vector to produce a probability distribution over the at least one new object being inside the semi-transparent container and the at least one new object being outside the semi-transparent container; and assigning the confidence score according to the probability that the at least one new object is outside the semi-transparent container.

According to some embodiments the vector is of dimension 1×2.

According to some embodiments the analyzing and assigning comprises inputting the cropped object image and a cropped empty-container image to a pre-trained pair classifier CNN, wherein the cropped empty-container image is a cropped image indicative of an empty state of the semi-transparent container and wherein the cropped empty-container image corresponds to the same area of the semi-transparent container as the cropped object image when the semi-transparent container is empty, wherein the pair classifier CNN arrives at an inference by: integrating the cropped object image and the cropped empty-container image into a single integrated image with combined channel information; processing, by consecutive convolutional layers, the integrated image thereby generating a vector; applying a softmax function to the vector to produce a probability distribution over the at least one new object being inside the semi-transparent container and the at least one new object being outside the semi-transparent container; and assigning the confidence score according to the probability that the at least one new object is outside the semi-transparent container.

According to some embodiments the vector is of dimension 1×2.

According to some embodiments the analyzing and assigning comprises feature comparison by: creating a binary map of the semi-transparent container by marking "foreground" pixels belonging to the semi-transparent container and marking "background" pixels which do not belong to the semi-transparent container; extracting, by a pre-trained network, features from foreground pixels from cropped images when the semi-transparent container is empty; extracting the same features from the cropped object image; measuring, by a similarity measure, a similarity between features of the cropped images when the semi-transparent container is empty and the cropped image object; and assigning the confidence score according to the measured similarity.

According to some embodiments the similarity measure is a cosine distance.

According to some embodiments the analyzing and assigning comprises: identifying straight lines that are associated with the semi-transparent container by: sampling a cropped image of the semi-transparent container when empty; detecting edge pixels with an edge detection filter; finding any straight lines in the image with a computer vision algorithm; disregarding straight lines that are not associated with the semi-transparent container by comparing to a binary map of the semi-transparent container; and evaluating the number of pixels in the cropped sample image associated with straight lines associated with the semi-transparent container; identifying straight lines in the cropped object image by detecting edge pixels with an edge detection filter and finding any straight lines in the image with a computer vision algorithm; evaluating the number of pixels in the cropped object image associated with straight lines associated with the semi-transparent container; and assigning the confidence score according to a mathematical relation between the number of pixels in the cropped sample image associated with straight lines associated with the semi-transparent container and the number of pixels in the cropped object image associated with straight lines associated with the semi-transparent container, wherein the binary map is produced by marking "foreground" pixels belonging to the semi-transparent container and marking "background" pixels which do not belong to the semi-transparent container.

According to some embodiments the edge detection filter is a Sobel filter.

According to some embodiments the computer vision algorithm comprises a Hough transform.

According to some embodiments the mathematical relation is the number of pixels in the cropped object image associated with straight lines associated with the semi-transparent container divided by the number of pixels in the cropped sample image associated with straight lines associated with the semi-transparent container.

According to some embodiments the method comprises: receiving images from at least two cameras, each at least two cameras calibrated to provide a single coordinate system for the semi-transparent container and each of the at least two cameras; associating, between images from the at least two cameras, at least one object common to images taken by separate cameras of the at least two cameras; correlating multiple detections of the at least one common object by extracting anchor points in each cropped object image and matching them across different images using the coordinate system established by the calibration to estimate a 3D location of the at least one common object; calculating the distance between the estimated 3D location and a boundary of the semi-transparent container; and assigning the confidence score according to the calculated distance.

According to some embodiments the final score is a weighted aggregation of a plurality of scores.

According to some embodiments the plurality of scores is produced by a corresponding plurality of analysis methods.

According to some embodiments the plurality of analysis methods are performed in sequence.

According to some embodiments the plurality of analysis methods are performed in parallel.

According to another embodiment there is provided a system for determining a position of an object with respect to a semi-transparent container, the system comprising: at least one camera affixed to the semi-transparent container and having a field of view covering at least a portion of an interior of the semi-transparent container; and at least one processor in operative communication with the at least one camera, wherein the at least one processor is configured to: receive, from the at least one camera at least one image of a scene in proximity to the semi-transparent container; detect at least one new object present in the at least one image, else marking the image as being an image indicative of a current state of the semi-transparent container; crop the at least one image to produce a cropped object image; analyze the cropped object image; and assign a confidence score in a numeric range to the cropped object image, wherein a score at one end of the range indicates the at least one new object corresponding to the cropped object image is inside the semi-transparent container, and wherein a score at the other end of the range indicates the at least one new object is outside the semi-transparent container.

According to some embodiments the processor is further configured to: (a) input the cropped object image to a pre-trained classifier convolutional neural network (CNN), wherein the classifier CNN arrives at an inference by: receiving the cropped object image; processing, by consecutive convolutional layers, the cropped object image, thereby generating a vector; applying a softmax function to the vector to produce a probability distribution over the at least one new object being inside the semi-transparent container and the at least one new object being outside the semi-transparent container; and (b) assign the confidence score according to the probability that the at least one new object is outside the semi-transparent container.

According to some embodiments the processor is further configured to: (a) input the cropped object image and a cropped empty-container image to a pre-trained pair classifier CNN, wherein the cropped empty-container image is a cropped image indicative of an empty state of the semi-transparent container and wherein the cropped empty-container image corresponds to the same area of the semi-transparent container as the cropped object image when the semi-transparent container is empty, wherein the pair classifier CNN arrives at an inference by: integrating the cropped object image and the cropped empty-container image into a single integrated image with combined channel information; processing, by consecutive convolutional layers, the integrated image thereby generating a vector; applying a softmax function to the vector to produce a probability distribution over the at least one new object being inside the semi-transparent container and the at least one new object being outside the semi-transparent container; and (b) assign the confidence score according to the probability that the at least one new object is outside the semi-transparent container.

According to some embodiments there may be at least two cameras, and the processor may be further configured to: receive images from the at least two cameras, each at least two cameras calibrated to provide a single coordinate system for the semi-transparent container and each of the at least two cameras; associate, between images from the at least two cameras, at least one object common to images taken by separate cameras of the at least two cameras; correlate multiple detections of the at least one common object by extracting anchor points in each cropped object image and matching them across different images using the coordinate system established by the calibration to estimate a 3D location of the at least one common object; calculate the distance between the estimated 3D location and a boundary of the semi-transparent container; and assign the confidence score according to the calculated distance.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7B is a flowchart showing a method according to some embodiments of the invention;

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

As used herein, the term "semi-transparent container" (or occasionally more briefly "container") may refer to a container having bounding walls through which the outside world can be observed. For example, a semi-transparent container may be a shopping basket or shopping cart. A semi-transparent container may comprise a mesh, particularly of metal, but also of any other material, such as wood, fiber, or plastic. A mesh may comprise straight lines/bars, particularly intersecting vertical and horizontal lines/bars, but also any other type of line/bar, such as curved or diagonal. The lines/bars may be of any thickness, spacing, and size. A semi-transparent container may have at least a portion of a wall fully opaque, for example a plastic advertising billboard attached at the front of a shopping cart.

Figure 1A:
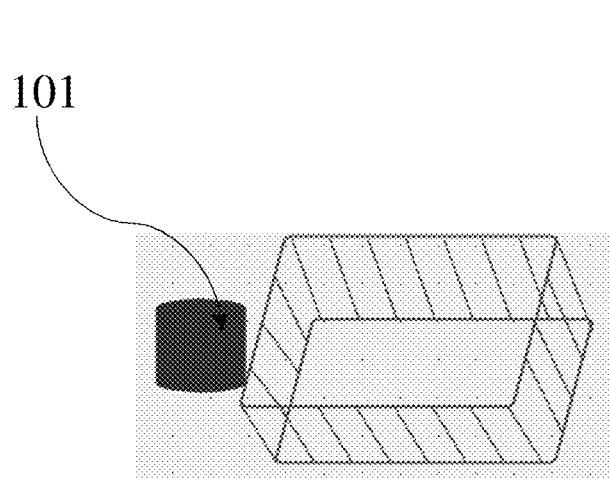
FIG. 1A is a schematic drawing of a possible 3D situation showing an object located outside of a semi-transparent container.
Figure 1B:
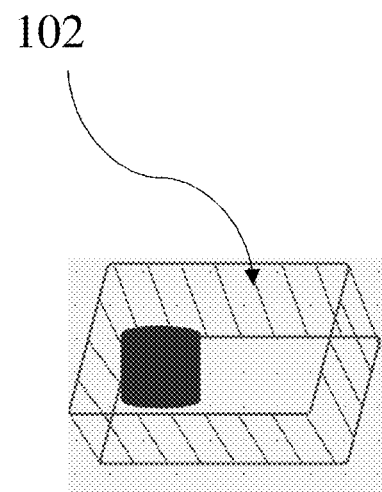
FIG. 1B is a schematic drawing of a possible 3D situation showing an object located inside of a semi-transparent container.
Figure 1C:
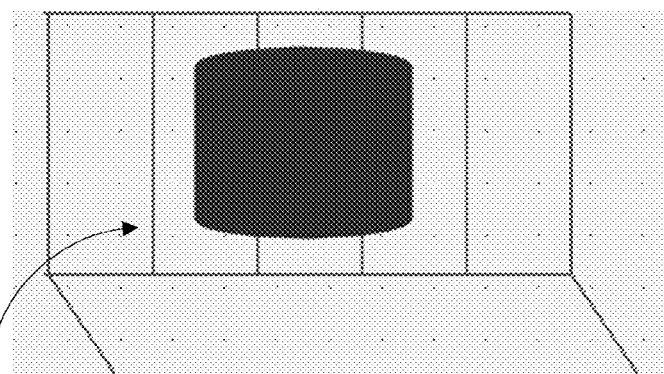
FIG. 1C is a schematic drawing showing a possible 2D projection of either of the 3D situations presented in FIGS. 1A and 1B.
Figure 2:
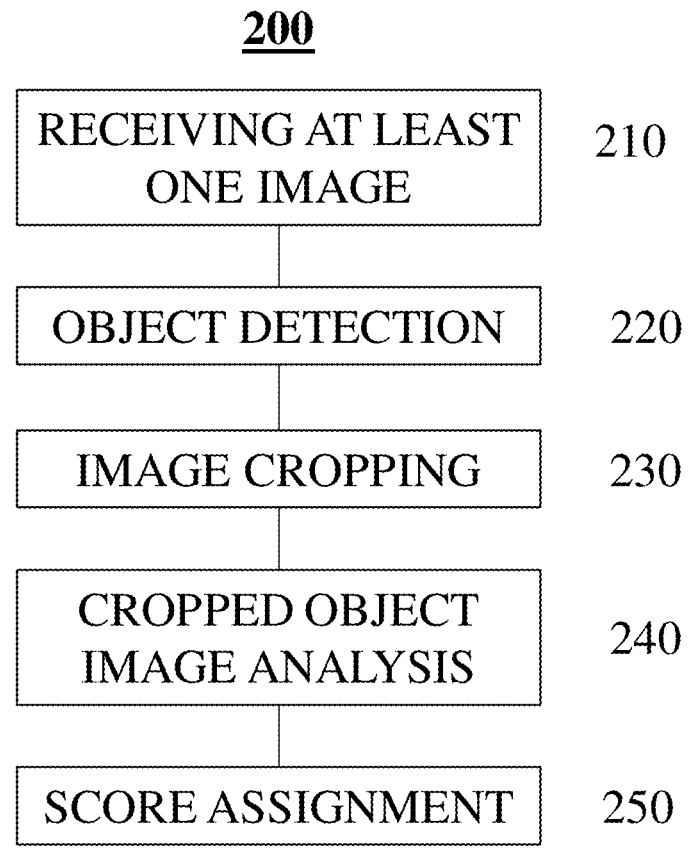
FIG. 2 is a flowchart showing a method according to some embodiments of the invention.

With reference to FIG. 2, there is provided a method 200 for determining a position of an object with respect to a semi-transparent container. Method 200 may comprise receiving (210), from at least one camera attached to a semi-transparent container, at least one image of a scene in proximity to the semi-transparent container. In proximity to the semi-transparent container may comprise at least a portion of an interior of the semi-transparent container and/or may comprise at least a portion of the environment exterior to an interior of the semi-transparent container.

Method 200 may further comprise detecting (220), by an object detector, at least one new object present in the at least one image, else marking the image as being an image indicative of a current state of the semi-transparent container. In other words, if a new object is not detected there may be no need to perform a new determination and previously acquired images may serve as a basis for the current contents of the semi-transparent container. Such a marked image may be used in subsequent determinations for the purposes of establishing a contextual "background" within the semi-transparent container, especially in analysis methods that utilize detection of lines/bars of the semi-transparent container (e.g. when filled with several items the walls of the shopping cart container may be blocked by the items and become less transparent, thus a new object placed in the center of the cart may not be observed relative to any bars of the cart). According to some embodiments, a new object may comprise an object which was not previously present in a previous image. According to some embodiments, a current state of the semi-transparent container may comprise an empty state (e.g. no objects inside container), a partially full state (e.g. at least one object inside container) or a full state (e.g. many objects inside container). According to some embodiments, the object detector may create a bounding perimeter (e.g. a bounding box) around an object in the image. According to some embodiments the object detector may use computer vision processes known in the art, such as image segmentation.

Method 200 may further comprise cropping (230), by a computer processor, the at least one image to produce a cropped object image. According to some embodiments the image is cropped according to the bounding perimeter identified by the object detector. According to some embodiments the image cropping may be effective to isolate just the new object. Alternatively, the image cropping may retain some level of background information for the purposes of further analysis, for example the image cropping may retain some bordering pixels not belonging to the identified object.

Method 200 may further comprise analyzing (240), by the computer processor, the cropped object image. According to some embodiments the analyzing may comprise several methods applied in parallel or in sequence, as detailed further herein below. According to some embodiments the analyzing may be performed by a computer processor as part of an "onboard" system attached to the semi-transparent container or may be performed by a computer processor in a separate system in wired or wireless communication with the onboard cameras.

Method 200 may further comprise assigning (250), by the computer processor, a confidence score in a numeric range to the cropped object image, wherein a score at one end of the range indicates the at least one new object corresponding to the cropped object image is inside the semi-transparent container, and wherein a score at the other end of the range indicates the at least one new object is outside the semi-transparent container.

According to some embodiments a confidence score between 0 and 1 may be assigned to the cropped object image, wherein a score of 0 indicates the at least one new object corresponding to the cropped object image is inside the semi-transparent container, and wherein a score of 1 indicates the at least one new object is outside the semi-transparent container. Any other definition of score may be used, for example interchanging the role of 0 and 1 and the relative positions they represent, or using any other interval, for example, but not limited to: 0-5, 1-5, 0-10, 1-10, 0-100, 1-100, etc. According to some embodiments the confidence score is a value in a continuous range, for example a score of 0.7 in the range 0-1. According to some embodiments, the confidence score may represent a probability.

According to some embodiments, the confidence score may be a final score which is a weighted aggregation of a plurality of scores arrived at by a corresponding plurality of analyses. The analyses may be the same analysis method performed multiple times or may be different methods of analysis. The analysis methods may be performed in parallel or in sequence. According to some embodiments the weights attributed to the scores arrived at by some analyses may be zero weights such that the corresponding analysis is considered not to take part in the overall analysis.

Figure 3:
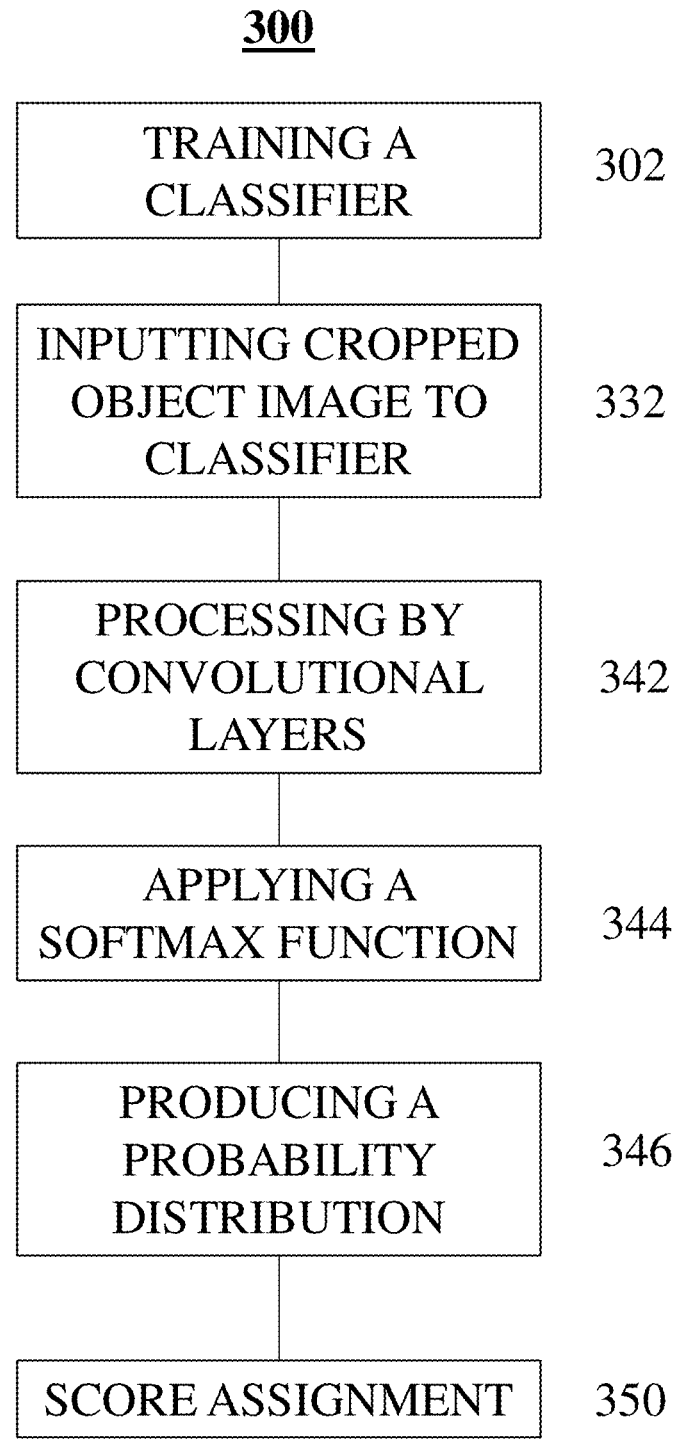
FIG. 3 is a flowchart showing a method according to some embodiments of the invention.

According to some embodiments, analyzing and assigning a score according to method 200 may comprise performing the steps of a method 300, as shown in FIG. 3. Method 300 may comprise inputting the cropped object image to a pre-trained classifier. The classifier may be a neural network. The classifier may be a convolutional neural network (CNN).

The classifier CNN may be trained (302) by presenting the classifier CNN with a set of labelled cropped images of objects. The cropped images may be labelled positively if the cropped image shows an object inside a semi-transparent container and otherwise labelled negatively if the cropped image shows an object outside a semi-transparent container. Alternatively any other labelling paradigm may be used, for example interchanging the association between positive/negative and inside/outside.

Training the classifier CNN may further comprise propagating the set of labelled cropped images through at least one convolutional layer of the classifier CNN. Training the classifier CNN may further comprise comparing an output of the classifier CNN to the labels and adjusting one or more weights of the CNN using a back-propagation process until a required validation accuracy is achieved.

At a time of inference, for example when a new determination needs to be made according to methods 200 and 300, the classifier CNN may arrive at an inference by receiving (332) the cropped object image and processing (342), by consecutive convolutional layers, the cropped object image to generate a vector. According to some embodiments the vector is of dimension 1×2. According to some embodiments a vector of any other dimension may be generated.

Arriving at an inference may further comprise applying (344) a softmax function to the vector to produce a probability distribution over the at least one new object being inside the semi-transparent container and the at least one new object being outside the semi-transparent container.

Method 300 may further comprise assigning (350) the confidence score according to the probability that the at least one new object is outside the semi-transparent container. Alternatively the confidence score may be assigned according to the probability that the object is inside the semi-transparent container.

Figure 4:
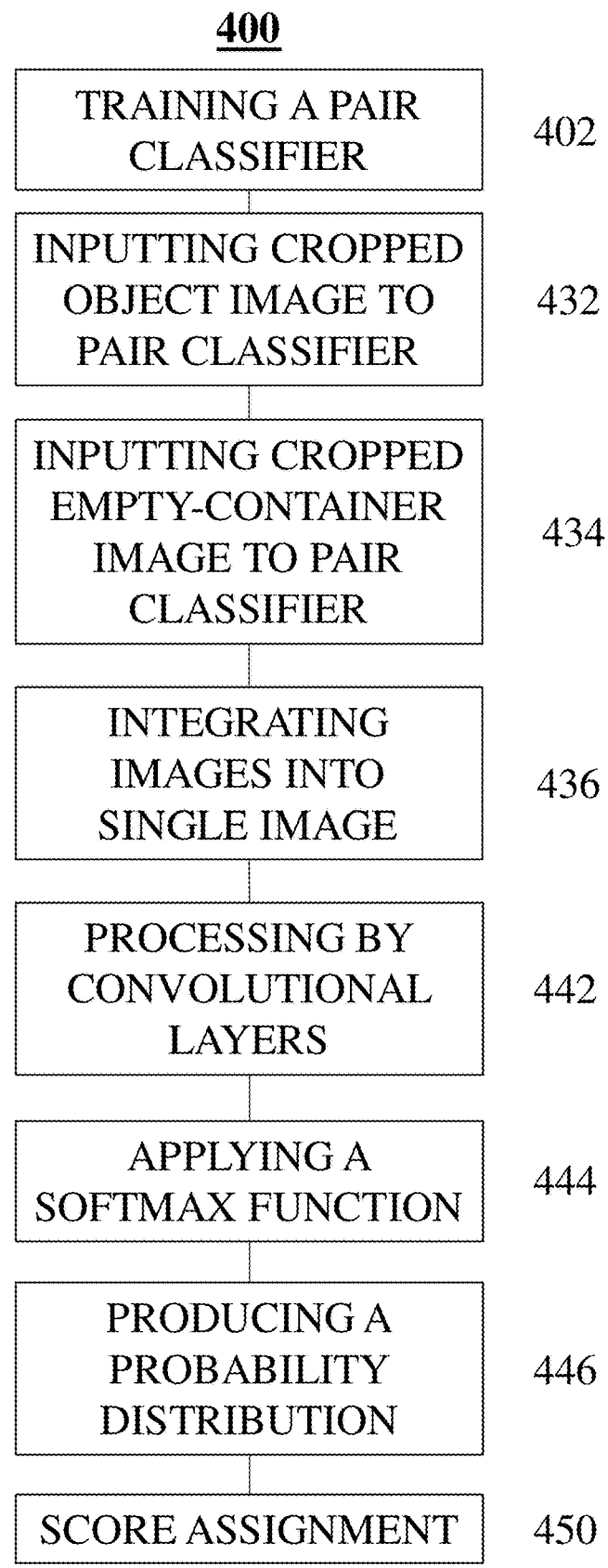
FIG. 4 is a flowchart showing a method according to some embodiments of the invention.

Alternatively, or complementarily, as part of analysing and assigning a score according to method 200, some embodiments of the present invention may involve the steps of a method 400, as shown in FIG. 4.

Method 400 may comprise inputting the cropped object image (432) and a cropped empty-container image (434) to a pre-trained pair classifier CNN. The cropped empty-container image may be a cropped image indicative of an empty state of the semi-transparent container before the at least one new object was detected and wherein the cropped empty-container image corresponds to the same area of the semi-transparent container as the cropped object image does when the semi-transparent container is empty. In other words, there is a correspondence between the cropped empty-container image and the cropped object image in that both pertain to the same area of the semi-transparent container, but one contains the object (the cropped object image) and the other (the cropped empty-container image) does not. For example, if the cropped object image is indicative of a region of the semi-transparent container spanning pixel 100 to pixel 200, then the cropped empty-container image should also correspond to the same region of the semi-transparent container spanning pixel 100 to pixel 200. A cropped empty-container image may be taken on start-up or initialization, capturing a "snapshot" of the semi-transparent container at time zero (presumed empty at time zero, for example, customer first picking up a shopping basket).

As part of method 400, the pair classifier CNN may be trained (402) by presenting the pair classifier CNN with pairs of image crops, each pair comprising a cropped empty-container image and a labelled cropped object image. Each pair may correspond to the same cropped area, and each labelled cropped object image may be labelled positively if the image crop shows an object inside a semi-transparent container and may be labelled negatively if the image crop shows an object outside a semi-transparent container.

Training 402 of method 400 may further comprise propagating the pairs through at least one convolutional layer of the pair classifier CNN. An output of the pair classifier CNN may then be compared to the labels, and one or more weights of the CNN may be adjusted using a back-propagation process until a required validation accuracy is achieved.

When an inference is required, method 400 may comprise integrating (436) the cropped object image and the cropped empty-container image into a single integrated image with combined channel information. The integrated image may then be processed (442) by consecutive convolutional layers to generate a vector. According to some embodiments the vector is of dimension 1×2. According to some embodiments a vector of any other dimension may be generated.

Method 400 may further comprise applying a softmax function to the vector to produce a probability distribution over the at least one new object being inside the semi-transparent container and the at least one new object being outside the semi-transparent container. Method 400 may also comprise assigning (450) the confidence score according to the probability that the at least one new object is outside the semi-transparent container. Alternatively, the probability that the object is inside the semi-transparent container may be used instead.

Figure 5:
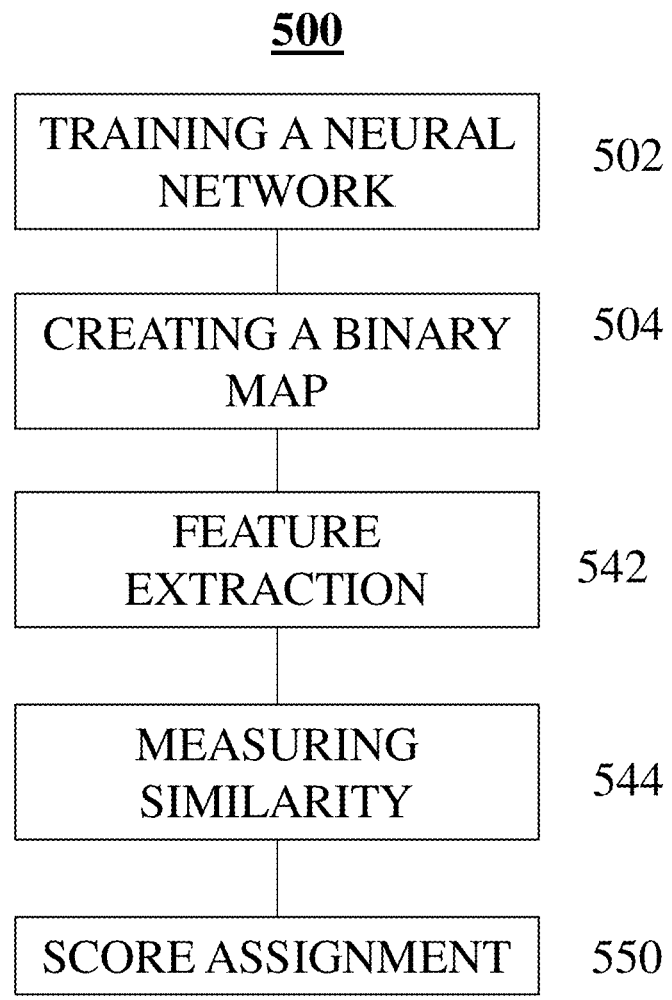
FIG. 5 is a flowchart showing a method according to some embodiments of the invention.

Alternatively, or complementarily, as part of analysing and assigning a score according to method 200 some embodiments of the present invention may involve the steps of a method 500, as shown in FIG. 5.

Method 500 may comprise feature comparison by creating (504) a binary map of the semi-transparent container by marking "foreground" pixels belonging to the semi-transparent container and marking "background" pixels which do not belong to the semi-transparent container. For example, foreground pixels may be marked with 0 and background pixels may be marked with 1. Alternatively, foreground pixels may be marked with 1 and background pixels may be marked with 0; the exact way in which pixels are marked is not as important as conveying a binary difference between those pixels which belong to the container and those which do not. The pixels could be labelled with one of TRUE or FALSE, for example.

Method 500 may further comprise extracting (542), by a pre-trained network, features from foreground pixels from cropped images when the semi-transparent container is empty, and extracting the same features from the cropped object image.

Method 500 may further comprise measuring (544), by a similarity measure, a similarity between features of the cropped images when the semi-transparent container is empty and the cropped image object. The similarity measure may be any mathematical measure known in the art. According to some embodiments the similarity measure is a cosine distance.

Method 500 may further comprise assigning (550) the confidence score according to the measured similarity. For example, a higher numeric quantification of similarity between the empty image and the cropped object image may be indicative of viewing the object through one or more bars of a semi-transparent container (e.g. bars similarly present in both images), thereby suggesting that the object is outside the container.

Figure 6:
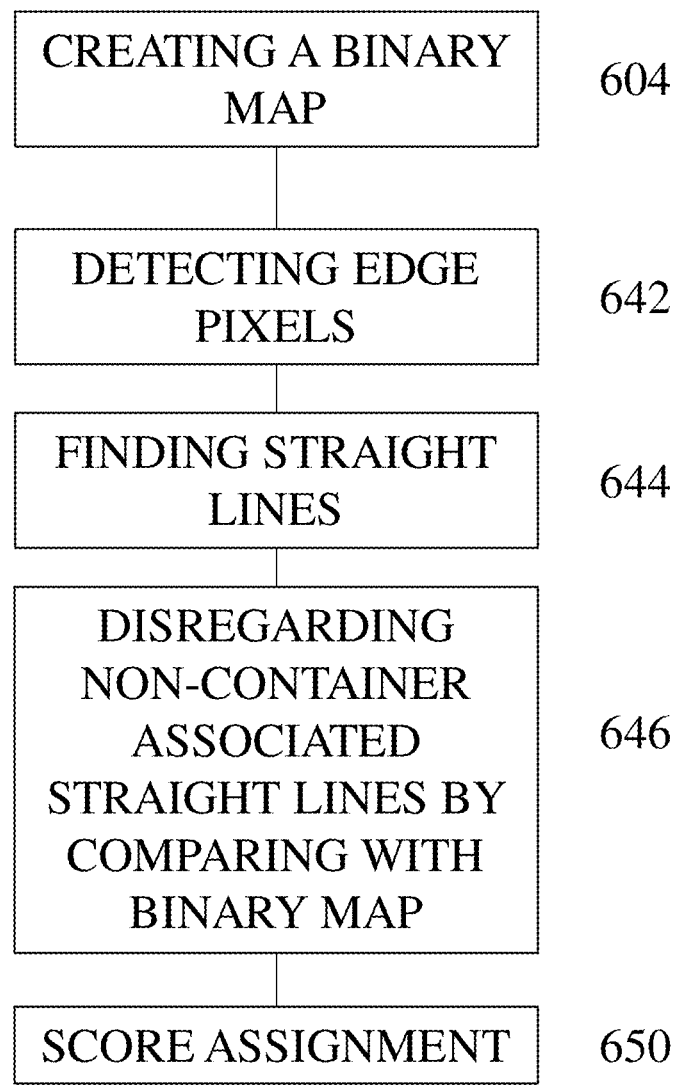
FIG. 6 is a flowchart showing a method according to some embodiments of the invention.

Alternatively, or complementarily, as part of analysing and assigning a score according to method 200 some embodiments of the present invention may involve the steps of a method 600, as shown in FIG. 6.

Method 600 may comprise identifying straight lines that are associated with the semi-transparent container by sampling a cropped image of the semi-transparent container when empty.

As part of identifying straight lines associated with the semi-transparent container, method 600 may comprise detecting (642) edge pixels with an edge detection filter. According to some embodiments the edge detection filter is a Sobel filter. As part of identifying straight lines associated with the semi-transparent container, method 600 may comprise finding (644) any straight lines in the image with a computer vision algorithm. According to some embodiments the computer vision algorithm comprises a Hough transform. Method 600 may comprise disregarding (646) any straight lines found by the computer vision algorithm which are not straight lines associated with the semi-transparent container by comparing to a binary map of the semi-transparent container. As has been described above, the binary map may be created (604) by marking "foreground" pixels belonging to the semi-transparent container and marking "background" pixels which do not belong to the semi-transparent container.

Method 600 may further comprise evaluating the number of pixels in the cropped sample image associated with straight lines associated with the semi-transparent container. The number of pixels in the cropped sample image associated with straight lines associated with the semi-transparent container may be referred to as N_empty.

Method 600 may further comprise identifying straight lines in the cropped object image by detecting edge pixels with an edge detection filter and finding any straight lines in the image with a computer vision algorithm.

Method 600 may comprise evaluating the number of pixels in the cropped object image associated with straight lines associated with the semi-transparent container. The number of pixels in the cropped object image associated with straight lines associated with the semi-transparent container may be referred to as N_image. N_image is always less than or equal to N_empty because the cropped object image corresponds to the same area of the semi-transparent container sampled in the cropped image of the semi-transparent container when empty. In other words, there cannot be more lines associated with the semi-transparent container (e.g. metal bars of shopping cart) in the cropped object image than in the same cropped image when the container is empty; either there are the same number of lines because the object is outside the container and is viewed through the semi-transparent container (e.g. object viewed overlayed with bars of the shopping cart) or the object is inside the container and partially blocks view of lines associated with the container, thereby reducing the evaluated number (e.g. object "in front of" some bars of an interior wall of the shopping cart).

Method 600 may comprise assigning (650) the confidence score according to a mathematical relation between the number of pixels in the cropped sample image associated with straight lines associated with the semi-transparent container and the number of pixels in the cropped object image associated with straight lines associated with the semi-transparent container. In other words, method 600 may assign the confidence score according to a mathematical relation between N_empty and N_image. According to some embodiments, the mathematical relation is N_image divided by N_empty, which due to N_image being less than or equal to N_empty is a value between 0 and 1.

Figure 7A:
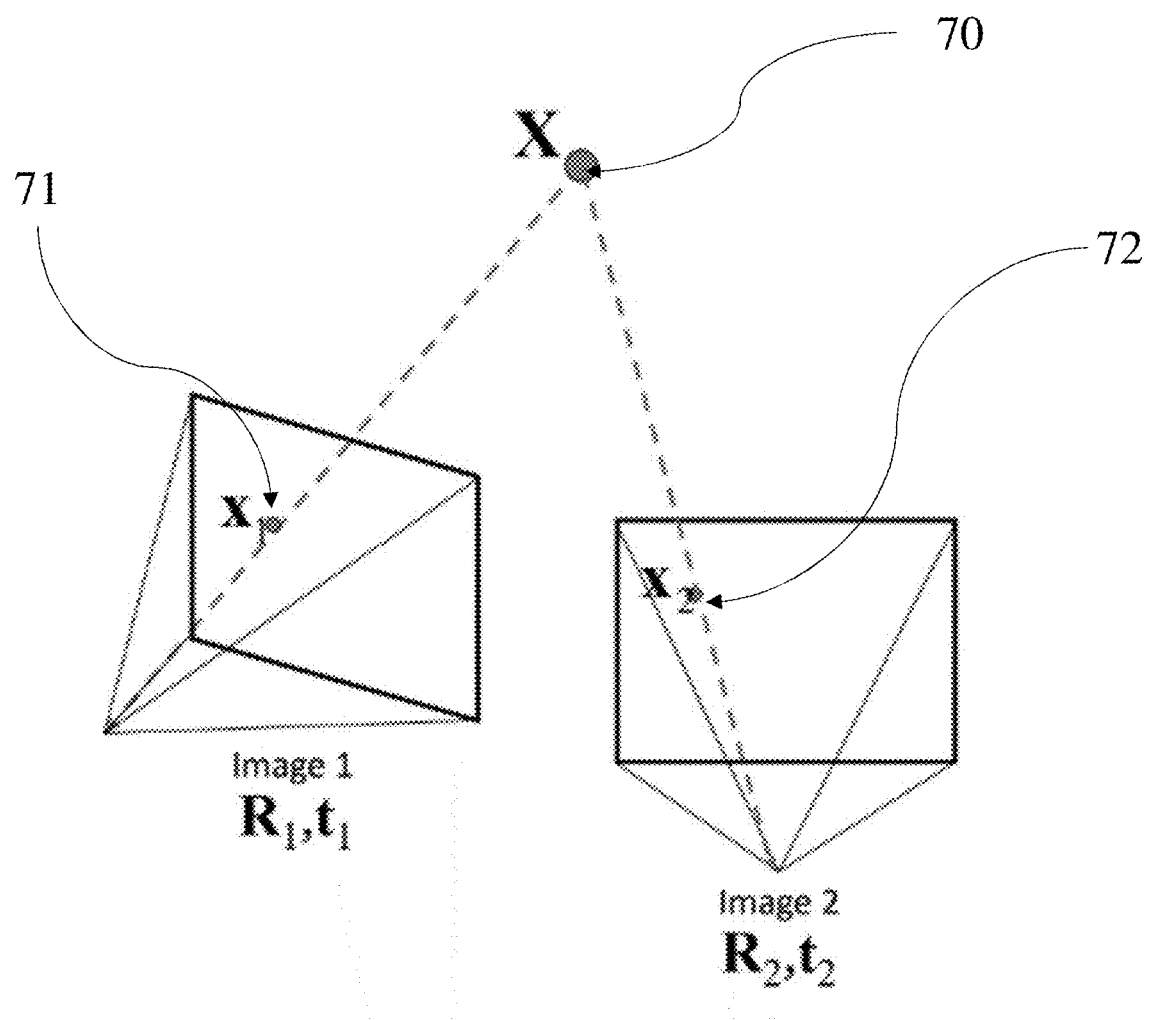
FIG. 7A is a schematic drawing showing 3D location estimation based on 2D images.

Alternatively, or complementarily, as part of analysing and assigning a score according to method 200 some embodiments of the present invention may involve the steps of a method 700, as shown in FIGS. 7A and 7B.

As shown in FIG. 7A, when more than one camera is observing the scene (here two cameras are shown but the method is equally applicable to any number of cameras greater than one) a 3D location of the object can be estimated. If an image 1 taken at time $t_1$ by a camera at position $R_1$ shows (71) an object located at a position $X_1$ within image 1, and an image 2 taken at time $t_2$ by a camera at position $R_2$ shows (72) an object located at a position $X_2$ within image 2, then the actual real world position X of the object 70 and not just the observed position can be determined.

Method 700 may therefore, as shown in FIG. 7B, comprise receiving (712) images from at least two cameras, each at least two cameras calibrated (702) to provide a single coordinate system for the semi-transparent container and each of the at least two cameras. The multi-camera calibration may comprise intrinsic calibration, extrinsic calibration, and container calibration.

Intrinsic calibration for each camera may comprise, for example, calibrating one or more lens parameters and a field of view (FOV) of the camera.

Extrinsic calibration for each camera may comprise, for example, calibrating location and orientation with respect to the semi-transparent container giving a single coordinate system XYZ for the container and all observing cameras.

Container calibration may comprise, for example, having performed extrinsic calibration and having prior knowledge of the container size, calculating the boundaries of the semi-transparent container in the single XYZ coordinate system.

Method 700 may further comprise associating (722), between images from the at least two cameras, at least one object common to images taken by separate cameras of the at least two cameras. The at least one object may be a new object.

Method 700 may further comprise correlating multiple detections of the at least one common object by extracting (724) anchor points in each cropped object image and matching them across different images using the coordinate system established by the calibration to estimate a 3D location of the at least one common object.

Method 700 may further comprise calculating (744) the distance between the estimated 3D location and a boundary of the semi-transparent container. The distance may be a Euclidean distance.

Method 700 may further comprise assigning the confidence score according to the calculated distance. For example, if the calculated distance indicates the 3D location of the object is further away from a camera than a length of the semi-transparent container, this may indicate the object is outside the semi-transparent container and the confidence score may be assigned accordingly.

Method 200 may comprise at least one of methods 300, 400, 500, 600 and/or 700. The "final" confidence score may be a weighted aggregation of scores produced by any one of methods 300, 400, 500, 600 and/or 700. As part of method 200, methods 300, 400, 500, 600 and/or 700 may be performed one after the other (in no particular order) or may alternatively be performed in parallel.

In any particular iteration of method 200 a zero weight may be applied to a score of one or more of methods 300, 400, 500, 600 and/or 700 such that the score produced by that method is not considered in the final aggregation. This may be due to changing contextual considerations between iterations, for example lack of available data.

According to an embodiment there is provided a system 800 for determining a position of an object 810 with respect to a semi-transparent container 820. System 800 comprises a semi-transparent container 820, at least one camera 830 and at least one processor 840.

The at least one camera 830 may have a FOV 835 which covers at least a portion of an interior of the semi-transparent container. FOV 835 may also cover at least a portion of the exterior environment, exterior to an interior of the semi-transparent container 820. The at least one camera 830 may be affixed to a top edge of the semi-transparent container 820. The at least one camera 830 may be angled such that its FOV 835 substantially covers the interior of the semi-transparent container.

The at least one processor 840 may be configured to carry out methods and processes as described herein. For example, processor 840 may carry out one or more of methods 200, 300, 400, 500, 600 and/or 700. The at least one processor 840 may be "on-board" the semi-transparent container 820 in wired or wireless communication with the at least one camera 830 or may alternatively be housed off-board the semi-transparent container 820 (e.g. in a server located instore or elsewhere) in wireless communication with the at least one camera 830. Processor 840 may be in operative communication with one or more object detectors, classifiers and/or neural networks. Processor 840 or multiple similar processors 840 may perform one or more roles described, for example, in method 200. For example, processor 840 may be configured as an object detector and/or for image cropping.

Figure 8:
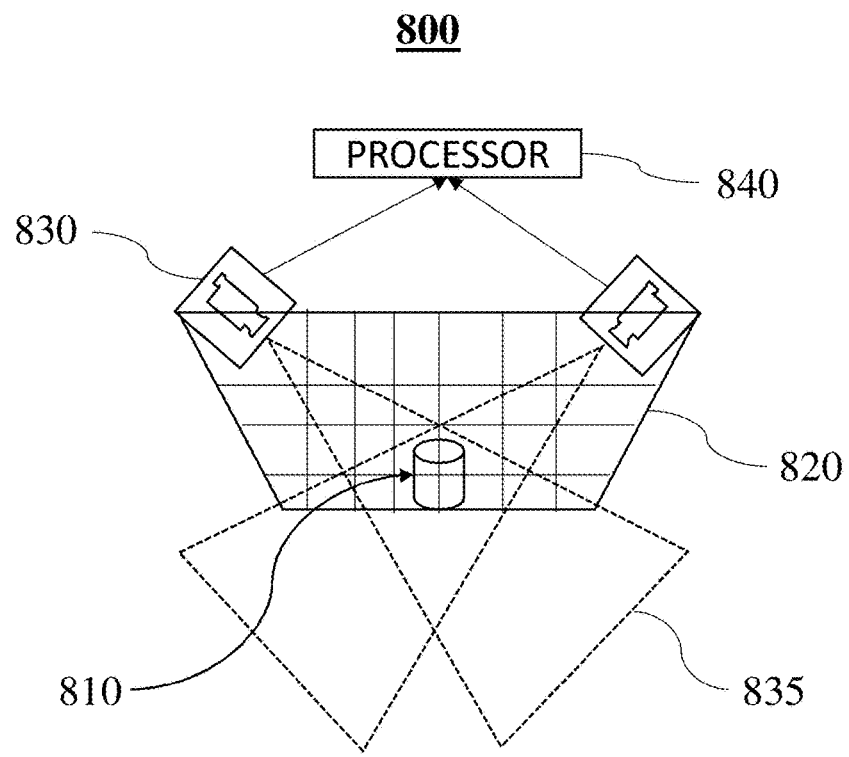
FIG. 8 is a schematic drawing showing a system according to some embodiments of the invention.
Figure 9:
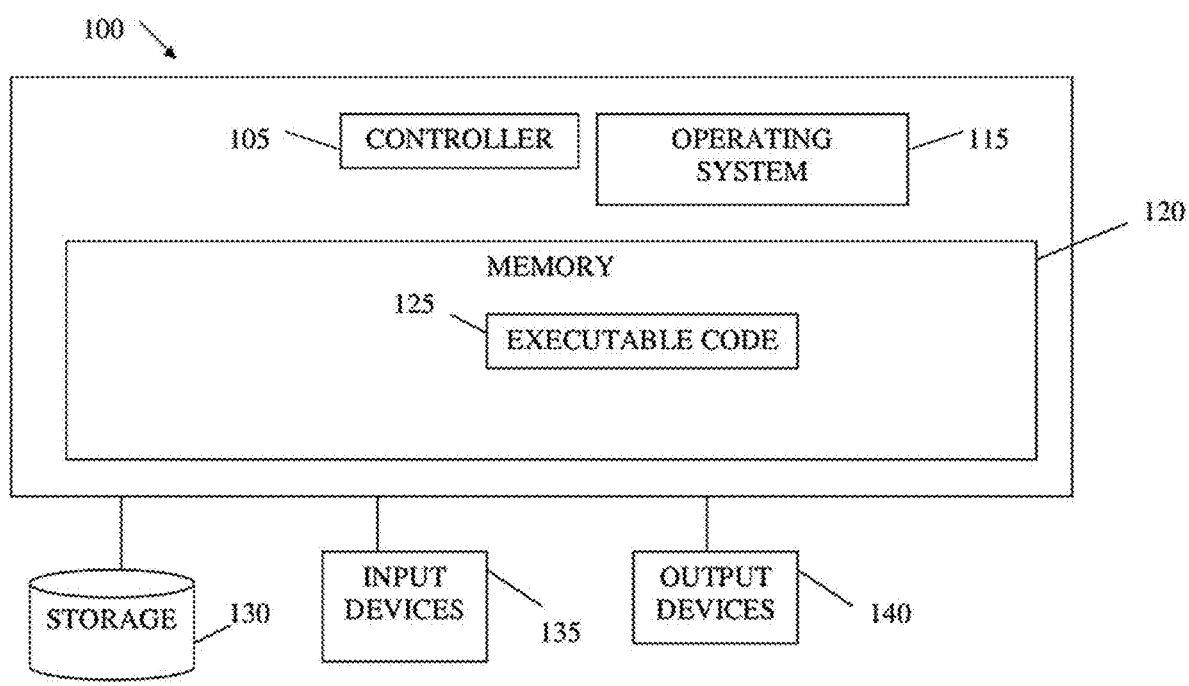
FIG. 9 is a schematic drawing showing a computing device according to some embodiments of the invention.

Reference is made to FIG. 9, showing a high-level block diagram of an exemplary computing device according to some embodiments of the present invention. Computing device 100 may include a controller 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, engines, etc. for example when executing code 125. More than one computing device 100 may be included in, and one or more computing devices 100 may be, or act as the components of, a system according to embodiments of the invention. Various components, computers, and modules of FIG. 8 (such as processor 840) may be or may include devices such as computing device 100.

Operating system 115 may be or may include any code segment (e.g., one similar to executable code 125) designed and/or configured to perform tasks involving coordination, scheduling, arbitration, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task, or script. Executable code 125 may be executed by controller 105 possibly under control of operating system 115. Although, for the sake of clarity, a single item of executable code 125 is shown in FIG. 9, a system according to some embodiments of the invention may include a plurality of executable code segments similar to executable code 125 that may be loaded into memory 120 or another non-transitory storage medium and cause controller 105, when executing code 125, to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Some of the components shown in FIG. 9 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. Any suitable number of input devices may be operatively connected to computing device 100 as shown by block 135. Output devices 140 may include one or more displays or monitors, speakers and/or any other suitable output devices. Any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

In some embodiments, device 100 may include or may be, for example, a personal computer, a desktop computer, a laptop computer, a workstation, a server computer, a network device, or any other suitable computing device. A system as described herein may include one or more devices such as computing device 100.

Figure 10:
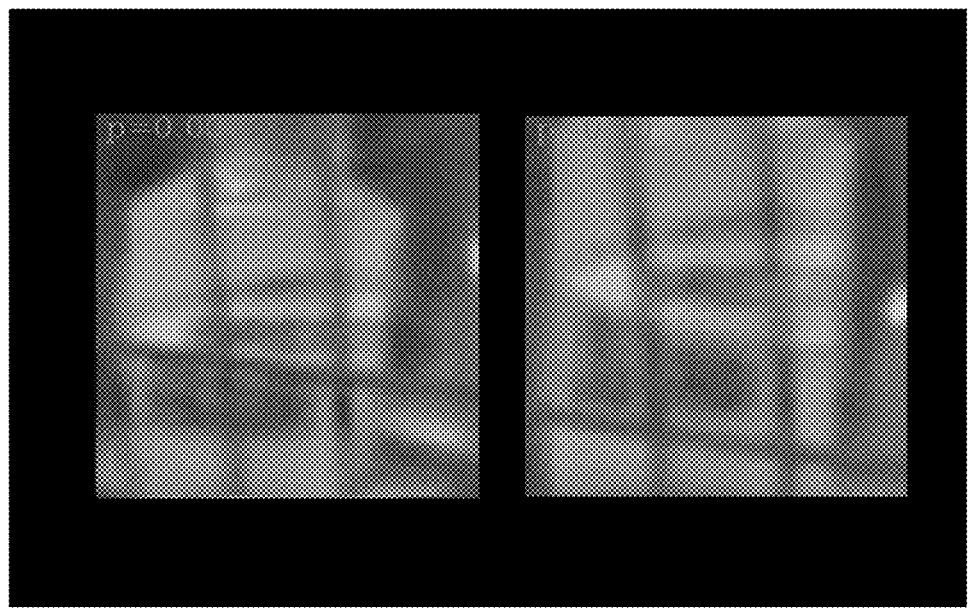
FIG. 10 is an image produced according to embodiments of the invention.

FIG. 10 shows an example image produced according to embodiments of the present invention. The "bars" of the semi-transparent container are seen in front of the object. In accordance with the labelling paradigm used in analyzing these images a confidence score (here a probability p) of zero has been assigned, indicating that the image is outside the semi-transparent container (e.g. the probability that the object is inside the container is zero).

Whilst multiple embodiments have been presented it is to be understand that features from one embodiment may be combined with features from another embodiment to arrive at any working combination.

The invention claimed is:

1. A method for determining a position of an object with respect to a semi-transparent container, the method comprising:
   receiving, from at least one camera attached to said semi-transparent container, at least one image of a scene in proximity to said semi-transparent container;
   detecting, by an object detector, at least one new object present in said at least one image, else marking said image as being an image indicative of a current state of said semi-transparent container;
   cropping, by a computer processor, said at least one image to produce a cropped object image;
   analyzing, by said computer processor, said cropped object image; and
   assigning, by said computer processor, and based on said analyzing, a confidence score in a numeric range to said cropped object image,
   wherein a score at one end of said range indicates said at least one new object corresponding to said cropped object image is inside said semi-transparent container, and wherein a score at the other end of said range indicates said at least one new object is outside said semi-transparent container,
   wherein said analyzing and assigning comprises:
   identifying straight lines that are associated with the semi-transparent container by:
      sampling a cropped image of the semi-transparent container when empty;
      detecting edge pixels with an edge detection filter;
      finding any straight lines in the image with a computer vision algorithm;
      disregarding straight lines that are not associated with the semi-transparent container by comparing to a binary map of said semi-transparent container; and
      evaluating the number of pixels in the cropped sample image associated with straight lines associated with the semi-transparent container;
   identifying straight lines in said cropped object image by detecting edge pixels with an edge detection filter and finding any straight lines in the image with a computer vision algorithm;
   evaluating the number of pixels in the cropped object image associated with straight lines associated with the semi-transparent container; and
   assigning said confidence score according to a mathematical relation between the number of pixels in the cropped sample image associated with straight lines associated with the semi-transparent container and the number of pixels in the cropped object image associated with straight lines associated with the semi-transparent container,
   wherein said binary map is produced by marking "foreground" pixels belonging to said semi-transparent container and marking "background" pixels which do not belong to said semi-transparent container.

2. The method of claim 1, wherein said analyzing and assigning comprises inputting said cropped object image to a pre-trained classifier convolutional neural network (CNN),
   wherein said classifier CNN arrives at an inference by:
      receiving said cropped object image;
      processing, by consecutive convolutional layers, said cropped object image, thereby generating a vector;
      applying a softmax function to said vector to produce a probability distribution over said at least one new object being inside the semi-transparent container and said at least one new object being outside the semi-transparent container; and
   assigning said confidence score according to the probability that said at least one new object is outside the semi-transparent container.

3. The method of claim 2 wherein said vector is of dimension 1×2.

4. The method of claim 1, wherein said analyzing and assigning comprises inputting said cropped object image and a cropped empty-container image to a pre-trained pair classifier CNN,
   wherein said cropped empty-container image is a cropped image indicative of an empty state of said semi-transparent container and wherein said cropped empty-container image corresponds to the same area of the semi-transparent container as the cropped object image when the semi-transparent container is empty,
   wherein said pair classifier CNN arrives at an inference by:
      integrating said cropped object image and said cropped empty-container image into a single integrated image with combined channel information;
      processing, by consecutive convolutional layers, said integrated image thereby generating a vector;
      applying a softmax function to said vector to produce a probability distribution over said at least one new object being inside the semi-transparent container and said at least one new object being outside the semi-transparent container; and
   assigning said confidence score according to the probability that said at least one new object is outside the semi-transparent container.

5. The method of claim 4 wherein said vector is of dimension 1×2.

6. The method of claim 1, wherein said analyzing and assigning comprises feature comparison by:
   creating a binary map of said semi-transparent container by marking "foreground" pixels belonging to said semi-transparent container and marking "background" pixels which do not belong to said semi-transparent container;
   extracting, by a pre-trained network, features from foreground pixels from cropped images when said semi-transparent container is empty;
   extracting the same features from said cropped object image;
   measuring, by a similarity measure, a similarity between features of said cropped images when said semi-transparent container is empty and the cropped image object; and
   assigning said confidence score according to the measured similarity.

7. The method of claim 6, wherein said similarity measure is a cosine distance.

8. The method of claim 1, wherein said edge detection filter is a Sobel filter.

9. The method of claim 1, wherein said computer vision algorithm comprises a Hough transform.

10. The method of claim 1, wherein said mathematical relation is the number of pixels in the cropped object image associated with straight lines associated with the semi-transparent container divided by the number of pixels in the cropped sample image associated with straight lines associated with the semi-transparent container.

11. The method of claim 1, comprising receiving images from at least two cameras, each at least two cameras calibrated to provide a single coordinate system for the semi-transparent container and each said at least two cameras;
associating, between images from the at least two cameras, at least one object common to images taken by separate cameras of said at least two cameras;
correlating multiple detections of said at least one common object by extracting anchor points in each cropped object image and matching them across different images using the coordinate system established by the calibration to estimate a 3D location of the at least one common object;
calculating the distance between said estimated 3D location and a boundary of said semi-transparent container; and
assigning said confidence score according to the calculated distance.

12. The method of claim 1, wherein a final score is a weighted aggregation of a plurality of scores.

13. The method of claim 12, wherein said plurality of scores is produced by a corresponding plurality of analysis methods.

14. The method of claim 13, wherein said plurality of analysis methods are performed in sequence.

15. The method of claim 13, wherein said plurality of analysis methods are performed in parallel.

16. A system for determining a position of an object with respect to a semi-transparent container, the system comprising:
at least one camera affixed to said semi-transparent container and having a field of view covering at least a portion of an interior of said semi-transparent container;
and at least one processor in operative communication with said at least one camera,
wherein said at least one processor is configured to:
receive, from said at least one camera at least one image of a scene in proximity to said semi-transparent container;
detect at least one new object present in said at least one image, else marking said image as being an image indicative of a current state of said semi-transparent container;
crop said at least one image to produce a cropped object image;
analyze said cropped object image; and
assign a confidence score in a numeric range to said cropped object image,
wherein a score at one end of said range indicates said at least one new object corresponding to said cropped object image is inside said semi-transparent container, and wherein a score at the other end of said range indicates said at least one new object is outside said semi-transparent container,
wherein said analyzing and assigning comprises:
identifying straight lines that are associated with the semi-transparent container by:
sampling a cropped image of the semi-transparent container when empty;
detecting edge pixels with an edge detection filter;
finding any straight lines in the image with a computer vision algorithm;
disregarding straight lines that are not associated with the semi-transparent container by comparing to a binary map of said semi-transparent container; and
evaluating the number of pixels in the cropped sample image associated with straight lines associated with the semi-transparent container;
identifying straight lines in said cropped object image by detecting edge pixels with an edge detection filter and finding any straight lines in the image with a computer vision algorithm;
evaluating the number of pixels in the cropped object image associated with straight lines associated with the semi-transparent container; and
assigning said confidence score according to a mathematical relation between the number of pixels in the cropped sample image associated with straight lines associated with the semi-transparent container and the number of pixels in the cropped object image associated with straight lines associated with the semi-transparent container,
wherein said binary map is produced by marking "foreground" pixels belonging to said semi-transparent container and marking "background" pixels which do not belong to said semi-transparent container.

17. The system of claim 16, wherein the processor is further configured to:
(a) input said cropped object image to a pre-trained classifier convolutional neural network (CNN),
wherein said classifier CNN arrives at an inference by:
receiving said cropped object image;
processing, by consecutive convolutional layers, said cropped object image, thereby generating a vector;
applying a softmax function to said vector to produce a probability distribution over said at least one new object being inside the semi-transparent container and said at least one new object being outside the semi-transparent container; and
(b) assign said confidence score according to the probability that said at least one new object is outside the semi-transparent container.

18. The system of claim 16, wherein the processor is further configured to:
(a) input said cropped object image and a cropped empty-container image to a pre-trained pair classifier CNN,
wherein said cropped empty-container image is a cropped image indicative of an empty state of said semi-transparent container and wherein said cropped empty-container image corresponds to the same area of the semi-transparent container as the cropped object image when the semi-transparent container is empty,
wherein said pair classifier CNN arrives at an inference by:
integrating said cropped object image and said cropped empty-container image into a single integrated image with combined channel information;
processing, by consecutive convolutional layers, said integrated image thereby generating a vector;
applying a softmax function to said vector to produce a probability distribution over said at least one new object being inside the semi-transparent container and said at least one new object being outside the semi-transparent container; and
(b) assign said confidence score according to the probability that said at least one new object is outside the semi-transparent container.

19. The system of claim 16 comprising at least two cameras, and wherein the processor is further configured to:
receive images from said at least two cameras, each at least two cameras calibrated to provide a single coordinate system for the semi-transparent container and each said at least two cameras;

associate, between images from the at least two cameras, at least one object common to images taken by separate cameras of said at least two cameras;

correlate multiple detections of said at least one common object by extracting anchor points in each cropped object image and matching them across different images using the coordinate system established by the calibration to estimate a 3D location of the at least one common object;

calculate the distance between said estimated 3D location and a boundary of said semi-transparent container; and assign said confidence score according to the calculated distance.

* * * * *